United States Patent
Dobson, Jr. et al.

(10) Patent No.: US 6,391,830 B1
(45) Date of Patent: *May 21, 2002

(54) DIVALENT CATION-CONTAINING WELL DRILLING AND SERVICING FLUIDS

(75) Inventors: James W. Dobson, Jr.; Kim O. Tresco; Jeffrey S. Lay, all of Houston, TX (US)

(73) Assignee: Texas United Chemical Company, LLC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/806,752

(22) PCT Filed: Jul. 31, 2000

(86) PCT No.: PCT/US00/20933

§ 371 Date: Apr. 2, 2001

§ 102(e) Date: Apr. 2, 2001

(87) PCT Pub. No.: WO01/10976

PCT Pub. Date: Feb. 15, 2001

Related U.S. Application Data

(63) Continuation-in-part of application No. 09/368,947, filed on Aug. 5, 1999, now Pat. No. 6,300,286.

(51) Int. Cl.⁷ .................................................. C09K 7/02
(52) U.S. Cl. ................ 507/111; 507/140; 507/145; 507/212; 507/269; 507/272; 507/277; 507/906; 507/925
(58) Field of Search ................... 507/111, 140, 507/145, 212, 269, 272, 277, 906, 925

(56) References Cited

U.S. PATENT DOCUMENTS

| | | | | |
|---|---|---|---|---|
| 4,175,042 A | * | 11/1979 | Mondshine | 507/140 |
| 4,427,556 A | * | 1/1984 | House et al. | 507/111 |
| 4,822,500 A | * | 4/1989 | Dobson, Jr. et al. | 507/111 |
| 5,514,644 A | * | 5/1996 | Dobson | 507/111 |
| 5,612,293 A | * | 3/1997 | Swartwoot et al. | 507/111 |
| 5,616,541 A | * | 4/1997 | Dobson, Jr. et al. | 507/111 |
| 5,641,728 A | * | 6/1997 | Dobson, Jr. et al. | 507/111 |
| 5,728,654 A | * | 3/1998 | Dobson, Jr. et al. | 507/111 |
| 5,783,527 A | * | 7/1998 | Dobson, Jr. et al. | 507/111 |
| 5,804,535 A | * | 9/1998 | Dobson et al. | 507/111 |
| 6,300,286 B1 | * | 10/2001 | Dobson, Jr. et al. | 507/111 |

* cited by examiner

*Primary Examiner*—Philip Tucker
(74) *Attorney, Agent, or Firm*—Roy F. House

(57) ABSTRACT

The invention provides clay-free, preferably biopolymer free, well drilling and servicing fluids comprising an aqueous divalent cation-containig water soluble salt, a bridging agent, and a pre-gelatinized crosslinked amylopectin starch suspending agent and fluid loss control additive. The concentration of the starch derivative is sufficient to provide the fluid with the following characteristics: (a) a low shear rate viscosity less than about 10,000 centipoise; (b) a high shear rate viscosity at 511 $sec^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F. The low shear rate viscosity of the fluids can be increased without increasing the high shear rate viscosity above about 70 centipoise by incorporating magnesium oxide and/or dipotassium hydrogen phosphate in the fluids. The invention also provides a method of making the clay-free well drilling and servicing fluid and a process of drilling, completing, and working over a well with the clay-free fluid.

24 Claims, No Drawings

DIVALENT CATION-CONTAINING WELL DRILLING AND SERVICING FLUIDS

This is a continuation-in-part of U.S. patent application Ser. No. 09/368,947 filed Aug. 5, 1999 now U.S. Pat. No. 6,300,286.

BACKGROUND OF THE INVENTION

The present invention relates to clay-free aqueous well drilling and servicing fluids, methods of preparation thereof, and method of drilling a well therewith.

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utlized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores. This is particularly critical in conducting horizontal drilling operations within hydrocarbon-containing formations.

Many clay-free fluids have been proposed for contacting the producing zone of oil and gas wells. See for example the following U.S. Patents: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine U.S. Pat. No. 4,186,803; Mondshine U.S. Pat. No. 4,369,843; Mondshine U.S. Pat. No. 4,620,596; Dobson, Jr. et al. U.S. Pat. No. 4,822,500, and Johnson U.S. Pat. No. 5,504,062.

These fluids generally contain polymeric viscosifiers such as certain polysaccharides or polysaccharide derivatives, polymeric fluid loss control additives such as lignosulfonates, polysaccharides or polysaccharide derivatives, and bridging solids. As disclosed in Dobson, Jr. et al. U.S. Pat. No. 4,822,500, a xanthan biopolymer and an epichlorohydrin crosslinked hydroxypropyl starch fluid loss control additive synergistically interact to provide suspension and fluid loss control in certain of these fluids.

Magnesium oxide has been disclosed for use in various polysaccharide containing fluids to increase the thermal stability thereof. See for example the following U.S. patents: Jackson U.S. Pat. No. 3,852,201; Jackson U.S. Pat. No. 3,953,335; Hartfield U.S. Pat. No. 3,988,246; Jackson U.S. Pat. No. 4,025,443; and Dobson, Jr. U.S. Pat. No. 5,514,644.

It is well known that certain biopolymer-containing fluids are shear thinning, exhibiting a high low shear rate viscosity and a low high shear rate viscosity. A near zero shear rate (0.06 to 0.11 sect$^{-1}$) viscosity provides a numerical value related to the ability of a fluid to suspend particles or cuttings under static conditions. Conversely, viscosity measured at shear rates above 20 sec$^{-1}$ relates to the hole cleaning capability of a fluid under annular flow conditions.

It is known to use dense brines as the base aqueous liquid for high density drilling and well servicing fluids. Such fluids contain minimal soluble bridging solids concentration and viscosifying polymer additives. The most commercially available dense brines contain calcium chloride, calcium bromide, and zinc bromide. However, utilization of the brines has been limited. Generally, water-soluble polymers used for viscosity and filtration control do not perform well in calcium bromide and zinc bromide brines. Examples of the use of dense brines for use in well drilling and servicing fluids are as follows: Swartwout et al. U.S. Pat. No. 5,612,293; Dobson, Jr. et al. U.S. Pat. No. 5,616,541; Dobson, Jr. et al. U.S. Pat. No. 5,728,652; Dobson, Jr. et al. U.S. Pat. No. 5,728,654; Vollmer et al. U.S. Pat. No. 5,785,747; and Dobson, Jr. et al. U.S. Pat. No. 5,804,535.

Clean-up of the filter cake deposited on the sides of the borehole is a critical part of the completion process to ensure maximum productivity from a wellbore. Poor wall cake development allows particulates or liquids to enter the formation resulting in internal formation damage. Solids or polymers which have not been removed from the surface of a borehole can also impede the flow of hydrocarbons by plugging a prepacked screen during production. Filter cake removal is generally undertaken by treating the wellbore with concentrated acid solution, particularly hydrochloric acid. Dobson, Jr. et al. U.S. Pat. No. 5,607,905 discloses the incorporation of certain inorganic peroxides into the filter cake which enhance the removal of the filter cake upon contacting it with an acidic solution. Brannon et al. U.S. Pat. No. 5,881,813 discloses an enzyme-containing clean-up fluid for degrading the residual polymeric viscosifiers present in filter cakes from drill-in fluids or present in the formation from other well treating fluids.

While these improvements in formulating well drilling and servicing fluids from high density brines have had commercial success, there is still a need for such fluids which exhibit enhanced particulate suspension characteristics at lower viscosities and which are easier and more completely removed from wellbores, screens, and the like present in hydrocarbon-containing formations.

SUMMARY OF THE INVENTION

The invention provides clay-free well drilling and servicing fluids comprising an aqueous brine which contains at least 1.2 equivalents per liter of a water soluble divalent cation salt, a particulate bridging agent which is insoluble in the aqueous brine, and a starch derivative which functions as a combination suspending agent and fluid loss control agent. The starch derivative is used in a concentration sufficient to provide the fluid with the following characteristics: (a) a low shear rate viscosity less than about 10,000 centipoise; (b) a high shear rate viscosity at 511 sec$^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F. The invention further provides that the low shear rate viscosity can be increased without raising the high shear rate viscosity above about 70 centipoise by incorporating magnesium oxide and/or dipotassium hydrogen phosphate in the fluids.

The preferred modified starch comprises amylopectin, such as a waxy starch, that has been crosslinked to the extent that the viscosity of a basic aqueous amylopectin starch suspension undergoing crosslinking is within about 25% to about 60% of the maximum viscosity that can be obtained, preferably from about 25% to less than about 50%, and pre-gelatinized.

The invention further comprises a process for preparing the clay-free fluids, and a process of drilling, completing, or working over a well with the clay-free fluids.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

The present invention is based on the discovery that certain starch derivatives function in certain dense brines to impart suspension characteristics and fluid loss control characteristics to the brines.

The brines useful in the compositions and processes of the invention contain at east 0.6 equivalents per liter of one or more water soluble divalent cation salts. referred divalent cations are the alkaline earth metal salts and/or zinc salts. The referred anion is a halide, most preferably chloride and/or bromide. Most preferred divalent cations are selected from the group consisting of calcium, magnesium, zinc, and mixtures thereof. Thus the most preferred salts are selected from the group consisting of calcium chloride, calcium bromide, magnesium chloride, magnesium bromide, zinc chloride, zinc bromide and mixtures thereof. Other divalent cation water soluble salts may be present in the brine.

The preferred brines have a density of at least about 10.0 ppg.

Starch is a natural polymer containing an abundance of hydroxyl groups. Each anhydroglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specified chemical contains two or more moieties capable of reacting with hydroxyl groups, there is the possibility of reacting two different hydroxyls resulting in crosslinking between hydroxyls on the same molecule or on different molecules.

The chemistry of starch and the preparation of a multitude of derivatives thereof is well known. A book entitled "Modified Starches: Properties and Uses," by O. B. Wurzburg, 1986 (CRC Press, Inc., Boca Raton, Fla., U.S.A.) is an excellent source for information in the preparation of modified starches. In regards to the preparation of the crosslinked starches of this invention, the chapter entitled "Crosslinked Starches" is particularly pertinent.

Representative crosslinking materials are epichlorohydrin and other epihalohydrns, formaldehyde, phosphorous oxychloride, trimetaphosphate, dialdehydes, vinyl sulfone, diepoxides, diisocyanates, bis(hydroxymethyl)ethylene urea, and the like. The preferred crosslinking compound is epichlorohydrin.

Crosslinking of the starch results in an increase in the molecular weight of the starch and an increase in the viscosity of aqueous dispersions of the starch.

The reaction conditions used in making crosslinked starches vary widely depending upon the specific bi-or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crossliking reagent with water. Konigsberg U.S. Pat. No. 2,500,950 discloses the crosslinking of starch with epoxyhalogen compounds such as epichlorohydrin. If desired, the starch can be suspended in non-aqueous liquids or aqueous solutions containing water soluble organic liquids during crosslinking. See for example Kesler et al. U.S. Pat. No. 2,845,417, incorporated herein by reference.

It is preferred that the amylopectin starch for use in the present invention be crosslinked with epichlorohydrin in a basic aqueous starch suspension at a temperature and for a period of time such that the Brabander viscosity of the suspension is within about 25% to about 60% of the maximum attainable viscosity, preferably from about 25% to less than about 50% of the maximum attainable viscosity. The viscosity will vary by the amount of crosslinking and the test conditions, i.e., temperature, concentrations, etc. A viscosity peak indicates maximum crosslinking. When the desired viscosity is reached, the crosslinkug reaction is terminated. A Brabender Viscometer is a standard viscometer readily available on the open market and well known to those skilled in the art.

As indicated, the crosslinked amylopectin starch of this invention is pre-gelatinized. The term "gelatinization" is well known in the art and is generally used to describe the swelling and hydration of starches. Starch granules are insoluble in cold water but imbibe water reversibly and swell slightly. However, in hot water, a large irreversible swelling occurs producing gelatinization. Gelatinization takes place over a discrete temperature range that depends on starch type. Since gelatinization increases the viscosity of a starch suspension, the gelatinization of the starch is preferably conducted after the amylopectin starch is crosslinked to the desired extent as indicated herein. Certain chemicals increase the gelatinization temperature range of starches and thus such chemicals can be present during the crosslinking of the amylopectin in order that the crosslinling temperature can be increased without gelatinization of the starch occurring. The term "pre-gelatmized" indicates that the crosslinked arnylopectin has been gelatinized such that the crosslinked amylopectin does not undergo gelatinization upon adding it to the brines of the present invention.

The crosslinked amylopectin is normally gelatinized by heating the crosslinked amylopectin at a temperature above the gelatinization temperature, such as during drying of the crosslinked starch slurry.

As indicated, the pre-gelatinized crosslinked amylopectin for use in the present invention is preferably derived from a waxy starch, preferably waxy corn (maize) starch. As is known, waxy starches are virtually all amylopectin whereas common starches contain both amylose and amylopectin molecules. For the purposes of disclosing and claiming this invention, the amylopectin contains less than about 10% by weight amylose, preferably not more than about 5% amylose and most preferably less than 1% amylose.

The brines may contain other compatible water soluble salts therein. The term "compatible" as used herein in regards to the present invention refers to a salt which does not result in precipitate formation in the brine and/or which does not prevent the disclosed pre-gelatinized crosslinked amylopectin starch from providing the brines with the characteristics set forth herein.

The fluids of this invention may contain other functional additives to impart specific properties to the fluids. Thus the fluids may contain weight materials (which may function as bridging agents in an appropriate particle size range), corrosion inhibitors, anti-oxidants, oxygen scavengers, reducing agents, supplemental fluid loss control additives, supplemental viscosifiers, and the like.

The fluids of this invention must have a bridging agent incorporated therein. The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid as is well known in the art. See for example Dobson, Jr. et al U.S. Pat. No. 5,616,541 and Johnson U.S. Pat. No. 5,504,062, both incorporated herein by reference. The bridging agent must not be appreciably soluble in the liquid used to prepare the fluid.

Representative water soluble salt bridging agents include sodium chloride, potassium chloride, magnesium chloride, potassium formate, calcium bromide, calcium chloride, and the like.

Preferred bridging agents have a specific gravity less than about 3.0 and are sufficiently acid soluble such that they readily decompose upon acidizing the filter cake and deposits in the borehole. Representative bridging agents are calcium carbonate, dolomite (calcium magnesium carbonate), colemanite, ulexite, analcite, apatite, bauxite, brucite, gibsite, and hydrotalcite.

The concentration of the bridging agents will be sufficient that, together with the concentration of the starch derivative, the fluids exhibit a fluid loss less than about 10 milliliters as measured at 185° F. and 250 psi differential pressure across a 5 micron disk for 30 minutes. Generally the concentration of the bridging agents will be from about 5 ppb to about 50 ppb, preferably from about 10 ppb to about 30 ppb.

The concentration of the starch derivative must be sufficient to provide the fluid with the following characteristics: (a) a low shear rate viscosity less than about 10,000 centipoise; (b) a high shear rate viscosity at 511 $sec^{-1}$ in the range from about 15 to about 70 centipoise measured at 120° F.; (c) a fluid loss less than about 10 milliliters as measured at 185° F. and 250 psi differential pressure across a 5 micron disc for 30 minutes; and (d) anti-settling characteristics as exhibited upon static aging the fluid for 16 hours at 185° F. Generally, the concentration of the starch derivative will be from about 5 ppb to about 12 ppb, preferably from about 6 ppb to about 11 ppb, and most preferably from about 7 ppb to about 10 ppb.

It is a novel feature of the invention that the starch derivative imparts excellent suspension characteristics to the fluids at the low viscosities imparted to the fluids. This is in direct contrast with fluids containing water soluble polymer viscosifiers, such as biopolymers, such as xanthan gum, scleroglucan gum, succinoglycan gum, and the like, in the dense brines used in the fluids of this invention.

It is preferred that the fluids of the invention do not contain any polymeric viscosifiers, such as biopolymers, i.e., the preferred fluids are biopolymer free.

Without being limited thereby, we believe that the buoyancy of the brines contributes to the suspension characteristics of the brines. Thus as the density of the dense brines increases, less viscosity development by the starch derivative is necessary for the excellent suspension characteristics observed. This has not been previously known. Indeed, prior art fluids as exemplified by the patents disclosed hereinbefore indicate that the fluids contain a biopolymer or amorphous silica viscosifier and suspending agent and generally a starch or derivative thereof as a filtration control additive.

The fluids of the invention may be prepared and the method of the invention practiced, by mixing the dense divalent cation-containing brine as set forth herein with the starch derivative, and the bridging agent, and any optional additives as disclosed herein. The concentration of the starch as disclosed herein is that concentration which will provide the fluid with the following characteristics: (a) a low shear rate viscosity less than about 10,000 centipoise; (b) a high shear rate viscosity at 511 $sec^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F.

After static aging the fluids in sealed pint jars, any separation or syneresis was noted by measuring the depth of separation. For purposes of this invention, the fluids of the invention exhibit no more than ¼ inch separation which is about 10% by volume. The settling characteristics of the aged fluids is then determined by inserting a spatula carefully into the fluids and observing if any solids had separated from the fluid. For purposes of this invention, the fluids exhibit no settling of solids.

The fluids of the invention are useful in various petroleum recovery operations such as well drilling, including drilling into hydrocarbon-containing formations, completion, workover and the like all as are well known in the art. Specifically the fluids of the invention are useful in drilling a well wherein the drilling fluid is circulated within a borehole being drilled as drilling proceeds, and in well completion and workover methods wherein a subterranean formation is contacted with an aqueous fluid to form a bridge and seal on the formation, all as are well known in the art.

The low shear rate viscosity (LSRV) for purposes of this invention is obtained using a Brookfield Model LVTDV-1 viscometer having a number 1 or 2 spindle at 0.3 revolutions per minute (shear rate of 0.0636 $sec^{-1}$). The fluid loss characteristics of the fluids are obtained by a modified API filtration test. Thus to an API high temperature filtration cell with removable end cages is added a 5 micron disk (i.e., an aluminum oxide (Aloxite™) ceramic disk having 5 micron pore throats, from 600 to 750 md permeability, which is 2.5 inches in diameter and 0.25 inch in depth) saturated with water. The fluid to be tested is poured along the inside edge of the filtration cell. The filtration test is then conducted for 30 minutes at the desired temperature of 185° F. under a pressure differential of 250 pounds per square inch supplied by nitrogen. The spurt loss is measured as the amount of fluid expelled from the filtration cell until the flow of fluid is reduced to drops. The fluid loss is measured as the total amount of fluid collected in 30 minutes.

The viscosities in centipoise at 1022 $sec^{-1}$, 511 $sec^{-1}$, 340.7 $sec^{-1}$, 170.3 $sec^{-1}$, 10.22 $sec^{-1}$, and 5.11$^{-1}$ are obtained by utilizing a Fann 35 Viscometer at 600 rpm, 300 rpm, 200 rpm, 100 rpm, 6 rpm, and 3 rpm by multiplying the Fann dial reading by 0.5, 1, 1.67, 3, 50, and 100, respectively.

In order to more completely describe the invention, the following non-limiting examples are given. In these examples and this specification, the following abbreviations may be used: API=American Petroleum Institute; XLAPS= the pre-gelatinized epichlorohydrin crosslinked amylopectin starch derivative of this invention which has been crosslinked to the extent that the viscosity of a basic aqueous amylopectin starch suspension undergoing crosslinking is within about 25% about 60% of the maximum viscosity which can be obtained; LSRV=Brookfield low shear rate viscosity at 0.03 revolutions per minute; 0.0636 $sec^{-1}$, in centipoise; high shear rate viscosity=Fann viscosity at 511 $sec^1$ in centipoise; sec =second(s); ppg=pounds per gallon; ppb=pounds per 42 gallon barrel; ° F.=degrees Fahrenheit; ml=milliliters; min=minutes; cp=centipoise; rpm= revolutions per minute; in=inches.

EXAMPLE 1

12.5 ppg fluids were prepared containing 0.98 bbl equivalents of a 12.25 ppg $CaBr_2$ brine, 23 ppb of a calcium carbonate bridging agent, and the concentrations of XLAPS, xanthan gum, scleroglucan gum, and succinoglycan gum set forth in Table 1. The rheology of the fluids before and after aging 16 hours at 85° C. (185° F.), and an indication of the suspension characteristics of the fluids after the static aging, were measured.

The data are set forth in Table 1.

EXAMPLE 2

13.5 ppg fluids were prepared containing 0.81 bbl equivalents of a 14.2 ppg $CaBr_2$ brine, 0.16 bbl equivalents of water, 26 ppb calcium carbonate bridging agent, and the concentrations of XLAPS, xanthan gum, scleroglucan gum, and succinoglycan gum set forth in Table 2. The fluids were evaluated as in Example 1. The data are set forth in Table 2.

EXAMPLE 3

14.5 ppg fluids were prepared containing 0.74 bbl equivalents of a 14.2 ppg $CaBr_2$ brine, 0.14 bbl equivalents of a 19.2 ppg $CaBr_2/ZnBr_2$ brine, 0.10 bbl equivalents of water, 0.25 ppb magnesium oxide, 23 ppb calcium carbonate bridging agent, and the concentrations of XLAPS, xanthan gum, scleroglucan gum, and succinoglycan gum set forth in Table 3. The fluids were evaluated as in Example 1. The data are set forth in Table 3.

EXAMPLE 4

15.5 ppg fluids were prepared containing 0.58 bbl equivalents of a 14.2 ppg $CaBr_2$ brine, 0.31 bbl equivalents of a 19.2 ppg $CaBr_2/ZnBr_2$ brine, 0.08 bbl equivalents of water, 0.25 ppb magnesium oxide, 25 ppb calcium carbonate bridging agent, and the concentrations of XLAPS, xanthan gum, scleroglucan gum, and succinoglycan gum set forth in Table 4. The fluids were evaluated as in Example 1. The data are set forth in Table 4.

EXAMPLE 5

16.5 ppg fluids were prepared containing 0.41 bbl equivalents of a 14.2 ppg $CaBr_2$ brine, 0.52 bbl equivalents of a 19.2 ppg $CaBr_2/ZnBr_2$, 0.05 bbl equivalents of water, 0.25 ppb of magnesium oxide, 23 ppb calcium carbonate bridging agent, and the concentrations of XLAPS, xanthan gum, scleroglucan gum, and succinoglycan gum set forth in Table 5. The fluids were evaluated as in Example 1. The data are set forth in Table 5.

In Tables 1–5, fluids C, D and E which don't contain the XLAPS of this invention are not examples of the invention, and are presented for comparison purposes only. The data indicate the excellent suspension characteristics of the fluids containing the XLAPS even at very low LSRV, and the very poor suspension characteristics of the fluids containing only the biopolymers. Incorporation of a biopolymer into the XLAPS-containing fluids increased the high shear rate viscosity and affected the LSRV in various ways depending upon the density of the fluids. The data also indicate that, in general, the LSRV decreases and the high shear rate viscosity increases as the concentration of zinc bromide in the fluids increases. However, the excellent suspension characteristics of the fluids was maintained.

EXAMPLE 6

CaCl2 fluids having densities of 9.5, 10.35 and 11.3 ppg were prepared each containing 8 ppb XLAPS and the concentration of MgO and calcium carbonate bridging agent set forth in Table 6. The fluids were evaluated as in Example 1. The data obtained are set forth in Table 6.

The data indicate that: (1) the density of the fluids should be greater than 9.5 ppg, preferably at least about 10.0 ppg; (2) magnesium oxide can be added to increase the viscosity of the fluids, as desired, especially the LSRV; and (3) the excellent suspension characteristics of the fluids of the fluids of the invention even at low LSRV.

EXAMPLE 7

14.6 ppg $CaBr_2/ZnBr_2$ fluids were prepared each containing 8 ppb XLAPS, 24 ppb $CaCO_3$ bridging agent, 0.71 bbl 14.2 ppg $CaBr_2$, 0.11 bbl water, 0.17 bbl 19.2 ppg $CaBr_2/ZnBr_2$, and the concentrations of MgO, $MgO_2$, sodium thiosulfate, and $K_2HPO_4$ set forth in Table 7. The fluids were evaluated as in Example 1. The data obtained are set forth in Table 7.

The data indicate that the magnesium oxide enhanced the thermal stability of the fluids containing the magnesium peroxide and sodium thiosulfate, and that the $K_2HPO_4$ increases the viscosity of the fluid after aging at 185° F., especially the LSRV.

EXAMPLE 8

A 14.6 ppg $CaBr_2/ZnBr_2$ fluid was prepared as in Example 7 containing 8 ppb XLAPS, 0.25 ppg MgO, and 24 ppb $CaCO_3$ bridging agent. The rheology of the fluid was measured at 120° F. initially and after aging the fluid for the time set forth in Table 8 at 185° F. The data obtained are set forth in Table 8.

The data indicate the excellent thermal stability and suspension characteristics of the fluid.

EXAMPLE 9

10.35 ppb $MgCl_2$ fluids were prepared containing 0.97 bbl of 10.0 ppg $MgCl_2$ brine, 8 ppb XLAPS, 26 ppb calcium carbonate bridging agent, and either 0 or 0.25 ppb MgO. The fluids were evaluated as before. The data obtained are set forth in Table 7.

The data indicate the excellent suspension characteristics of the XLAPS in $MgCl_2$-containing brines, and the increase of the LSRV upon addition of the MgO.

EXAMPLE 10

The high temperature, high pressure fluid loss for fluids 4-A, Table 4, and 5-A, Table 5, were determined at 185° F., 250 psi differential pressure across a 5 micron disk. The data obtained are as follows. Fluid 4-A: Initial—Spurt Loss=1.5 ml, 30 min.=3 ml; Aged @ 185° F.—Spurt Loss=2.5 ml, 30 min=3.5 ml. Fluid 5-A: Initial—Spurt Loss=1.5 ml, 30 min=3 ml; Aged @ 185° F.—Spurt Loss=2 ml, 30 min=4 ml.

These data illustrate the excellent fluid loss characteristics of the fluids of this invention.

The data in the Tables indicate that the LSRV of the fluids of this invention can be increased by the addition of magnesium oxide, dipotassium hydrogen phosphate, or biopolymers to the fluids, particularly after subjecting the fluids to elevated temperatures as would occur on using the fluids in the drilling or servicing of wells. The data also indicate that only low concentrations of the biopolymer can be incorporated into the fluids without unduly raising the high shear rate viscosity, i.e., at 511 $sec^{-1}$. Thus the LSRV of the fluids can be increased without unduly raising the high shear rate viscosity by the addition of magnesium oxide and/or dipotassium hydrogen phosphate to the fluids, preferably in an amount from about 0.1 ppb to about 5 ppb. It is another aspect of the invention to increase the low shear rate viscosity of the fluids of the invention without increasing the high shear rate viscosity above about 70 centipoise by the addition of magnesium oxide and/or dipotassium hydrogen phosphate to the fluids. Thus the low shear rate viscosity of the fluids can be greater than 10,000 centipoise upon the addition of an additive which raises the low shear rate viscosity of the fluids without raising the high shear rate viscosity above about 70.

TABLE 1

12.5 ppg $CaBr_2$ Fluids

| Fluid | 1-A | 1-B | 1-C | 1-D | 1-E | 1-F | 1-G | 1-H |
|---|---|---|---|---|---|---|---|---|
| XLAPS, ppb | 8.0 | 10.0 | 0 | 0 | 0 | 8.0 | 8.0 | 8.0 |
| Xanthan, ppb | 0 | 0 | 1.5 | 0 | 0 | 1.5 | 0 | 0 |
| Scleroglucan, ppb | 0 | 0 | 0 | 1.5 | 0 | 0 | 1.5 | 0 |
| Succinoglycan, ppb | 0 | 0 | 0 | 0 | 1.5 | 0 | 0 | 1.5 |
| Initial Rheology at 120° F. | | | | | | | | |
| 1022 $sec^{-1}$, cp | 18 | 30 | 15.5 | 14.5 | 11 | 80 | 49 | 65 |
| 511 $sec^{-1}$, cp | 22 | 40 | 19 | 2112 | 11 | 4 | 70 | 90 |
| 10.22 $sec^{-1}$, cp | 150 | 150 | 50 | 350 | 0 | 650 | 850 | 300 |
| 0.0636 $sec^{-1}$, cp | 3039 | 2600 | 1920 | 9,878 | 120 | 17,700 | 54,300 | 700 |
| STI | 138 | 65 | 101 | 470 | 10 | 155 | 776 | 8 |
| Static Aged at 185° F. for 16 hours | | | | | | | | |
| Separation | None | None | Total | None | Total | None | None | None |
| Settling | None | None | | None | | None | None | None |
| 1022 $sec^{-1}$, cp | 17.5 | 29.5 | 14.5 | 14 | 10 | 75 | 47.5 | 55 |
| 511 $sec^{-1}$, cp | 20 | 38 | 17 | 21 | 11 | 105 | 72 | 72 |
| 10.22 $sec^{-1}$, cp | 50 | 150 | 50 | 350 | 100 | 500 | 900 | 150 |
| 0.0636 $sec^{-1}$, cp | 440 | 500 | 600 | 12,357 | 0 | 10,300 | 50,700 | 900 |
| STI | 22 | 13 | 5 | 588 | 0 | 98 | 704 | 12.5 |

TABLE 2

13.5 ppg $CaBr_2$ Fluids

| Fluid | 2-A | 2-B | 2-C | 2-D | 2-E | 2-F | 2-G | 2-H |
|---|---|---|---|---|---|---|---|---|
| XLAPS, ppb | 7.0 | 10.0 | 0 | 0 | 0 | 8.0 | 8.0 | 8.0 |
| Xanthan, ppb | 0 | 0 | 1.5 | 0 | 0 | 1.5 | 0 | 0 |
| Scleroglucan, ppb | 0 | 0 | 0 | 1.5 | 0 | 0 | 1.5 | 0 |
| Succinoglycan, ppb | 0 | 0 | 0 | 0 | 1.5 | 0 | 0 | 1.5 |
| Initial Rheology at 120° F. | | | | | | | | |
| 1022 $sec^{-1}$, cp | 18.5 | 35 | 23.5 | 4.5 | 4.5 | 89 | 37.5 | 65 |
| 511 $sec^{-1}$, cp | 23 | 47 | 30 | 4 | 5 | 140 | 44 | 85 |
| 10.22 $sec^{-1}$, cp | 200 | 200 | 150 | 0 | 0 | 900 | 100 | 150 |
| 0.0636 $sec^{-1}$, cp | 5700 | 9200 | 280 | 60 | 100 | 13,500 | 300 | 800 |
| STI | 248 | 196 | 9 | 15 | 20 | 96 | 7 | 9 |
| Static Aged at 185° F. for 16 hours | | | | | | | | |
| Separation, in | None | None | Total | Total | Total | None | 0.5 | None |
| Settling | None | None | | | | None | None | None |
| 1022 $sec^{-1}$, cp | 20.5 | 40 | 19.5 | 4 | 25.5 | 95 | 37.5 | 99 |
| 511 $sec^{-1}$, cp | 25 | 53 | 24 | 4 | 33 | 145 | 43 | 142 |
| 10.22 $sec^{-1}$, cp | 150 | 200 | 50 | 0 | 150 | 1100 | 150 | 1000 |
| 0.0636 $sec^{-1}$, cp | 1180 | 7200 | 100 | 20 | 280 | 19,800 | 4800 | 16,100 |
| STI | 47 | 136 | 4 | 5 | 9 | 137 | 112 | 113 |

TABLE 3

14.5 ppg $CaBr_2/ZnBr_2$ Fluids

| Fluid | 3-A | 3-B | 3-C | 3-D | 3-E | 3-F | 3-G | 3-H |
|---|---|---|---|---|---|---|---|---|
| XLAPS, ppb | 7.0 | 10.0 | 0 | 0 | 0 | 8.0 | 8.0 | 8.0 |
| Xanthan, ppb | 0 | 0 | 1.5 | 0 | 0 | 1.5 | 0 | 0 |
| Scleroglucan, ppb | 0 | 0 | 0 | 1.5 | 0 | 0 | 1.5 | 0 |
| Succinoglycan, ppb | 0 | 0 | 0 | 0 | 1.5 | 0 | 0 | 1.5 |
| Initial Rheology at 120° F. | | | | | | | | |
| 1022 $sec^{-1}$, cp | 19 | 38.5 | 14 | 13 | 3.5 | 75 | 72.5 | 31.5 |
| 511 $sec^{-1}$, cp | 23 | 50 | 17 | 14 | 4 | 109 | 90 | 37 |
| 10.22 $sec^{-1}$, cp | 150 | 200 | 100 | 100 | 0 | 600 | 150 | 50 |
| 0.0636 $sec^{-1}$, cp | 2200 | 8000 | 20 | 60 | 60 | 6900 | 500 | 1300 |
| STI | 96 | 160 | 1 | 4 | 15 | 63 | 6 | 35 |
| Static Aged at 185° F. for 16 hours | | | | | | | | |
| Separation | None | None | Total | Total | Total | None | None | None |
| Settling | None | None | | | | None | None | None |
| 1022 $sec^{-1}$, cp | 19.5 | 41 | 25 | 10 | 20.5 | 78.5 | 66 | 74 |
| 511 $sec^{-1}$, cp | 23 | 53 | 34 | 11 | 26 | 117 | 80 | 107 |
| 10.22 $sec^{-1}$, cp | 100 | 200 | 200 | 100 | 150 | 900 | 150 | 850 |
| 0.0636 $sec^{-1}$, cp | 680 | 3800 | 200 | 20 | 140 | 18,700 | 600 | 10,600 |
| STI | 30 | 72 | 6 | 2 | 5 | 160 | 7.5 | 99 |

TABLE 4

15.5 ppg $CaBr_2/ZnBr_2$ Fluids

| Fluid | 4-A | 4-B | 4-C | 4-D | 4-E | 4-F | 4-G | 4-H |
|---|---|---|---|---|---|---|---|---|
| XLAPS, ppb | 8.0 | 10.0 | 0 | 0 | 0 | 8.0 | 8.0 | 8.0 |
| Xanthan, ppb | 0 | 0 | 1.5 | 0 | 0 | 1.5 | 0 | 0 |
| Scleroglucan, ppb | 0 | 0 | 0 | 1.5 | 0 | 0 | 1.5 | 0 |
| Succinoglycan, ppb | 0 | 0 | 0 | 0 | 1.5 | 0 | 0 | 1.5 |
| Initial Rheology at 120° F. | | | | | | | | |
| 1022 $sec^{-1}$, cp | 29 | 46.5 | 11.5 | 16 | 5.5 | 96 | 89 | 36.5 |
| 511 $sec^{-1}$, cp | 37 | 61 | 13 | 16 | 6 | 145 | 110 | 43 |
| 10.22 $sec^{-1}$, cp | 150 | 300 | 0 | 0 | 50 | 1050 | 150 | 50 |
| 0.0636 $sec^{-1}$, cp | 2000 | 7600 | 40 | 20 | 80 | 6800 | 600 | 400 |
| STI | 54 | 126 | 3 | 1 | 13 | 47 | 5 | 9 |
| Static Aged at 185° F. for 16 hours | | | | | | | | |
| Separation | None | None | Total | Total | Total | None | None | None |
| Settling | None | None | | | | None | None | None |
| 1022 $sec^{-1}$, cp | 31.5 | 47 | 21.5 | 12 | 29.5 | 100 | 77 | 90 |
| 511 $sec^{-1}$, cp | 39 | 61 | 27 | 12 | 39 | 148 | 85 | 126 |
| 10.22 $sec^{-1}$, cp | 150 | 200 | 150 | 0 | 200 | 1000 | 150 | 900 |
| 0.0636 $sec^{-1}$, cp | 900 | 2400 | 80 | 0 | 80 | 7800 | 300 | 7400 |
| STI | 23 | 39 | 3 | 0 | 2 | 53 | 4 | 59 |

TABLE 5

16.5 ppg $CaBr_2/ZnBr_2$ Fluids

| Fluid | 5-A | 5-B | 5-C | 5-D | 5-E | 5-F | 5-G | 5-H |
|---|---|---|---|---|---|---|---|---|
| XLAPS, ppb | 8.0 | 10.0 | 0 | 0 | 0 | 8.0 | 8.0 | 8.0 |
| Xanthan, ppb | 0 | 0 | 1.5 | 0 | 0 | 1.5 | 0 | 0 |
| Scleroglucan, ppb | 0 | 0 | 0 | 1.5 | 0 | 0 | 1.5 | 0 |
| Succinoglycan, ppb | 0 | 0 | 0 | 0 | 1.5 | 0 | 0 | 1.5 |
| Initial Rheology at 120° F. | | | | | | | | |
| 1022 $sec^{-1}$, cp | 38 | 44.5 | 10.5 | 22 | 6 | 117 | 120 | 93.5 |
| 511 $sec^{-1}$, cp | 42 | 55 | 12 | 24 | 7 | 165 | 150 | 112 |
| 10.22 $sec^{-1}$, cp | 150 | 200 | 100 | 50 | 50 | 900 | 250 | 200 |
| 0.0636 $sec^{-1}$, cp | 500 | 7800 | 40 | 0 | 20 | 4800 | 800 | 600 |

TABLE 5-continued

16.5 ppg CaBr$_2$/ZnBr$_2$ Fluids

| Fluid | 5-A | 5-B | 5-C | 5-D | 5-E | 5-F | 5-G | 5-H |
|---|---|---|---|---|---|---|---|---|
| STI | 12 | 142 | 3 | 0 | 3 | 29 | 5 | 5 |
| Static Aged at 185° F. for 16 hours | | | | | | | | |
| Separation | None | None | Total | Total | Total | None | None | None |
| Settling | None | None | | | | None | None | None |
| 1022 sec$^{-1}$, cp | 37.5 | 65 | 20 | 16.5 | 20.5 | 127 | 92 | 144 |
| 511 sec$^{-1}$, cp | 46 | 83 | 25 | 18 | 25 | 178 | 108 | 198 |
| 10.22 sec$^{-1}$, cp | 150 | 300 | 100 | 0 | 100 | 1050 | 200 | 1350 |
| 0.0636 sec$^{-1}$, cp | 500 | 2100 | 360 | 20 | 200 | 5700 | 400 | 15,000 |
| STI | 11 | 25 | 14 | 1 | 8 | 228 | 4 | 76 |

TABLE 6

CaCl$_2$ Fluids
8 ppb XLAPS

| Fluid | 6-A | 6-B | 6-C | 6-D | 6-E | 6-F |
|---|---|---|---|---|---|---|
| Density, ppg | 9.5 | 9.5 | 10.35 | 10.35 | 11.3 | 11.3 |
| 9.15 ppg CaCl$_2$, bbl | 0.97 | 0.97 | 0 | 0 | 0 | 0 |
| 10.0 ppg CaCl$_2$, bbl | 0 | 0 | 0.97 | 0.97 | 0 | 0 |
| 11.0 ppg CaCl$_2$, bbl | 0 | 0 | 0 | 0 | 0.97 | 0.97 |
| CaCO$_3$, ppb | 25 | 25 | 26 | 26 | 25 | 25 |
| MgO, ppb | 0 | 0.25 | 0 | 0.25 | 6 | 0.25 |
| Initial Rheology at 120° F. | | | | | | |
| 1022 sec$^{-1}$, cp | 8.5 | 11.5 | 15 | 19 | 26.5 | 31 |
| 511 sec$^{-1}$, cp | 11 | 17 | 18 | 27 | 33 | 41 |
| 10.22 sec$^{-1}$, cp | 50 | 250 | 50 | 300 | 150 | 300 |
| 0.0636 sec$^{-1}$, cp | 5520 | 15,737 | 2300 | 16,357 | 4000 | 20,296 |
| STI | 502 | 926 | 128 | 606 | 121 | 495 |
| Static Aged at 185° F. for 16 hours | | | | | | |
| Separation, in | 1 | 1.25 | 0.25 | 0.25 | 0.25 | None |
| Settling | Settling | Settling | None | None | None | None |
| 1022 sec$^{-1}$, cp | 8.5 | 13 | 15.5 | 22.5 | 26 | 35 |
| 511 sec$^{-1}$, cp | 11 | 19 | 19 | 33 | 33 | 48 |
| 10.22 sec$^{-1}$, cp | 50 | 250 | 0 | 480 | 150 | 500 |
| 0.0636 sec$^{-1}$, cp | 3500 | 21,695 | 1120 | 33,693 | 1820 | 33,896 |
| STI | 318 | 1142 | 59 | 1021 | 55 | 706 |

TABLE 7

8 ppb XLAPS

| | 14.6 ppg CaBr$_2$/ZnBr$_2$ Fluids | | | | 10.35 ppg MgCl$_2$ | |
|---|---|---|---|---|---|---|
| Fluid | 7-A | 7-B | 7-C | 7-D | 9-A | 9-B |
| MgO, ppb | 0.25 | 0 | 0 | 0.25 | 0 | 0.25 |
| Mg Peroxide, ppb | 0.5 | 0.5 | 0.5 | 0 | 0 | 0 |
| Sodium Thiosulphate, ppb | 0.5 | 0.5 | 1.0 | 0 | 0 | 0 |
| K$_2$HPO$_4$, ppb | 0 | 0 | 3.0 | 0 | 0 | 0 |
| Initial Rheology at 120° F. | | | | | | |
| 1022 sec$^{-1}$, cp | 23.5 | 24 | 23 | 26.5 | 20.5 | 19 |
| 511 sec$^{-1}$, cp | 30 | 30 | 29 | 34 | 23 | 27 |
| 10.22 sec$^{-1}$, cp | 200 | 100 | 100 | 200 | 150 | 50 |
| 0.0636 sec$^{-1}$, cp | 3200 | 3500 | 3479 | 4000 | 4599 | 6399 |
| STI | 107 | 117 | 120 | 118 | 200 | 237 |
| Static Aged at 185° F. for 16 hours | | | | | | |
| Separation, in | None | None | None | None | 0.25 | 0.25 |
| Settling | None | None | None | None | None | None |
| 1022 sec$^{-1}$, cp | 25 | 24.5 | 32.5 | 27 | 22 | 21.5 |
| 511 sec$^{-1}$, cp | 31 | 30 | 44 | 35 | 28 | 30 |
| 10.22 sec$^{-1}$, cp | 100 | 50 | 450 | 200 | 250 | 150 |
| 0.0636 sec$^{-1}$, cp | 6000 | 520 | 24,595 | 2100 | 6019 | 11,618 |
| STI | 194 | 17 | 559 | 57 | 215 | 387 |

TABLE 8

14.6 ppg CaBr$_2$/ZnBr$_2$ Fluids
8 ppb XLAPS, 0.25 ppb MgO

| Hr. Aged @ 185° F. | 0 | 16 | 36 | 62 | 72 | 144 | 316 |
|---|---|---|---|---|---|---|---|
| 1022 sec$^{-1}$, cp | 26.5 | 27 | 28.5 | 29.5 | 29.5 | 28 | 29.5 |
| 511 sec$^{-1}$, cp | 34 | 35 | 37 | 39 | 39 | 37 | 39 |
| 340.7 sec$^{-1}$, cp | 39 | 40.5 | 43.5 | 46.5 | 46.5 | 45 | 46.5 |
| 170.3 sec$^{-1}$, cp | 51 | 54 | 57 | 63 | 63 | 63 | 63 |
| 10.22 sec$^{-1}$, cp | 200 | 200 | 200 | 250 | 300 | 250 | 250 |
| 5.11 sec$^{-1}$, cp | 300 | 300 | 300 | 400 | 400 | 400 | 400 |
| 0.0636 sec$^{-1}$, cp | 3997 | 1240 | 2100 | 5599 | 5919 | 6079 | 5059 |

TABLE 8-continued

| | 14.6 ppg CaBr$_2$/ZnBr$_2$ Fluids 8 ppb XLAPS, 0.25 ppb MgO | | | | | | |
|---|---|---|---|---|---|---|---|
| Hr. Aged @ 185° F. | 0 | 16 | 36 | 62 | 72 | 144 | 316 |
| STI | 118 | 35 | 57 | 144 | 152 | 164 | 130 |
| Separation | — | None | None | None | None | None | None |
| Settling | — | None | None | None | None | None | None |

What is claimed is:

1. A clay-free well drilling and servicing fluid comprising an aqueous brine containing at least 1.2 equivalents per liter of a water soluble divalent cation salt, a particulate bridging agent which is insoluble in the aqueous liquid, and a starch derivative wherein the concentration of the starch derivative is sufficient to provide the fluid with the following characteristics: (a) a low shear rate viscosity less than about 10,000 centipoise; (b) a high shear rate viscosity at 511 sec$^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F., and wherein the starch derivative comprises a pre-gelatinized crosslinked amylopectin starch which has been crosslinked to the extent that the viscosity of a basic aqueous amylopectin starch suspension undergoing crossliking is within about 25% to about 60% of the maximum viscosity which can be obtained.

2. The fluid of claim 1 wherein the amylopectin starch is crosslinked with epichlorohydrin.

3. The fluid of claim 2 wherein the density of the fluid is at least about 10 ppg.

4. The fluid of claim 2 wherein the water soluble divalent cation salt is selected from the group consisting of the alkaline earth metal halide salts, the zinc halide salts, and mixtures thereof.

5. The fluid of claim 2 wherein the concentration of the starch derivative is from about 5 ppb to about 12 ppb.

6. The fluid of claim 2, 3, 4, or 5 additionally containing an additive selected from the group consisting of magnesium oxide, dipotassium hydrogen phosphate, and mixtures thereof, in an amount sufficient to increase the low shear rate viscosity without increasing the high shear rate viscosity above 70 centipoise.

7. A process of preparing a clay-free well drilling and servicing fluid, the fluid comprising an aqueous brine containing at least 1.2 equivalents per liter of a water soluble divalent cation salt and a particulate bridging agent which is insoluble in the aqueous liquid, which comprises adding to the fluid a starch derivative in an amount sufficient to provide the fluid with the following characteristics: (a) a low shear rate viscosity less than about 10,000 centipoise; (b) a high shear rate viscosity at 511 sec$^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F., wherein the starch derivative comprises a pre-gelatinized crosslinked amylopectin starch which has been crosslinked to the extent that the viscosity of a basic aqueous amylopectin starch suspension_undergoing crosslinking is within about 25% to about 60% of the maximum viscosity which can be obtained.

8. The process of claim 7 wherein the amylopectin starch is crosslinked with epichlorohydrin.

9. The process of claim 8 wherein the density of the fluid is at least about 10 ppg.

10. The process of claim 8 wherein the water soluble divalent cation salt is selected from the group consisting of the alkaline earth metal halide salts, the zinc halide salts, and mixtures thereof.

11. The process of claim 8 wherein the concentration of the starch derivative is from about 5 ppb to about 12 ppb.

12. The process of claim 8, 9, 10, or 11 additionally containing an additive selected from the group consisting of magnesium oxide, dipotassium hydrogen phosphate, and mixtures thereof, in an amount sufficient to increase the low shear rate viscosity without increasing the high shear rate viscosity above 70 centipoise.

13. A process of drilling a well wherein a drilling fluid is circulated within the wellbore being drilled as drilling proceeds which comprises using as the drilling fluid the fluid of claim 1, 2, 3, 4, or 5.

14. In a process of completing or working over a well wherein a subterranean formation is contacted with an aqueous liquid, the improvement comprising using as the aqueous fluid the fluid of claim 1, 2, 3, 4, or 5.

15. A process of drilling a well wherein a drilling fluid is circulated within the wellbore being drilled as drilling proceeds which comprises using as the drilling fluid the fluid of claim 1, 2, 3, 4, or 5, wherein the fluid additionally contains an additive selected from the group consisting of magnesium oxide, dipotassium hydrogen phosphate, and mixtures thereof, in an amount sufficient to increase the low shear rate viscosity without increasing the high shear rate viscosity above 70 centipoise.

16. In a process of completing or working over a well wherein a subterranean formation is contacted with an aqueous liquid, the improvement comprising using as the aqueous fluid the fluid of claim 1, 2, 3, 4, or 5, wherein the fluid additionally contains an additive selected from the group consisting of magnesium oxide, dipotassium hydrogen phosphate, and mixtures thereof, in an amount sufficient to increase the low shear rate viscosity without increasing the high shear rate viscosity above 70 centipoise.

17. The fluid of claim 1, 4, or 5 wherein the density of the fluid is at least about 10 ppg.

18. The fluid of claim 17 additionally containing an additive selected from the group consisting of magnesium oxide, dipotassium hydrogen phosphate, and mixtures thereof, in an amount sufficient to increase the low shear rate viscosity without increasing the high shear rate viscosity above 70 centipoise.

19. The process of claim 7, 10, 11 wherein the density of the fluid is at least about 10 ppg.

20. The process of claim 19 additionally containing an additive selected from the group consisting of magnesium oxide, dipotassium hydrogen phosphate, and mixtures thereof, in an amount sufficient to increase the low shear rate viscosity without increasing the high shear rate viscosity above 70 centipoise.

21. The process of claim 13 wherein the density of the fluid is at least about 10 ppg.

22. The process of claim 14 wherein the density of the fluid is at least about 10 ppg.

23. The process of claim 15 wherein the density of the fluid is at least about 10 ppg.

24. The process of claim 16 wherein the density of the fluid is at least about 10 ppg.

* * * * *